Oct. 31, 1944.   H. J. LEWIS   2,361,780
EXTRACTION PROCESS
Filed Jan. 12, 1942   2 Sheets-Sheet 1
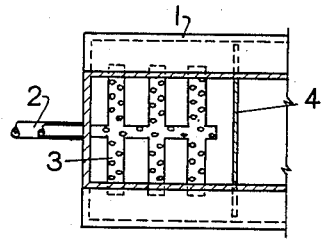
Fig. II
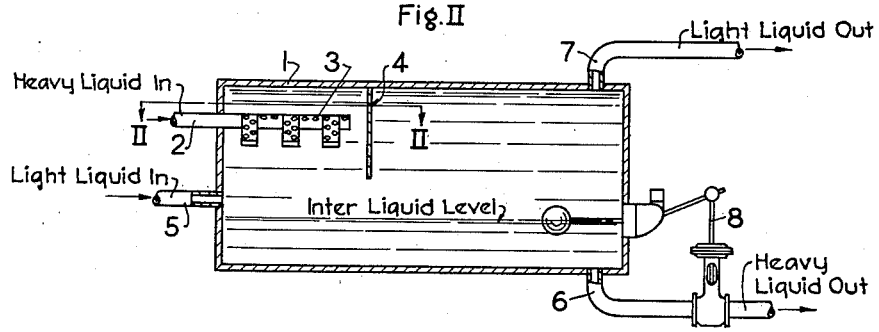
Fig. I
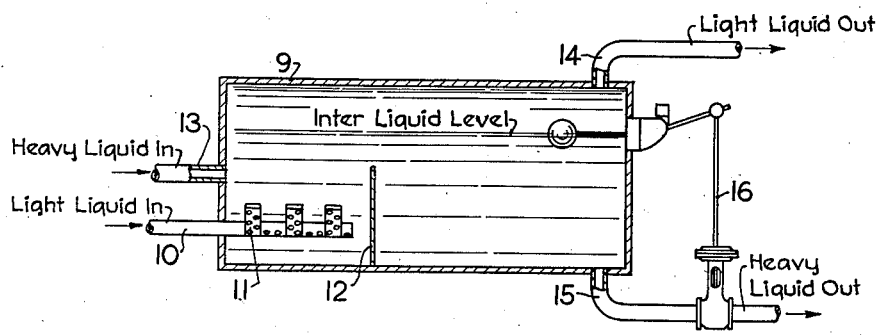
Fig. III
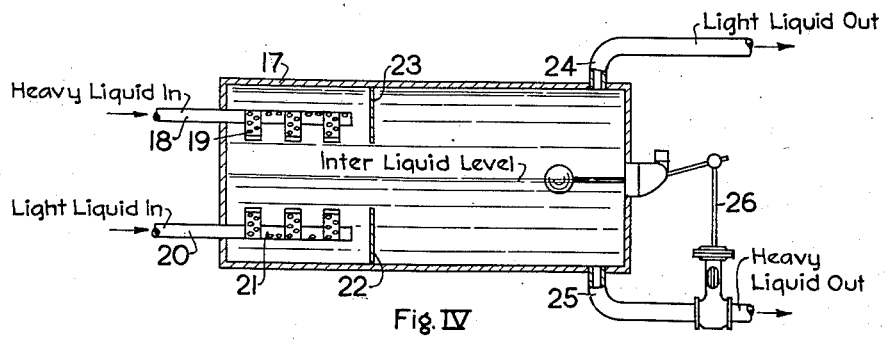
Fig. IV
Inventor: Harold J. Lewis
By His Attorney:

Oct. 31, 1944.　　　H. J. LEWIS　　　2,361,780
EXTRACTION PROCESS
Filed Jan. 12, 1942　　　2 Sheets-Sheet 2
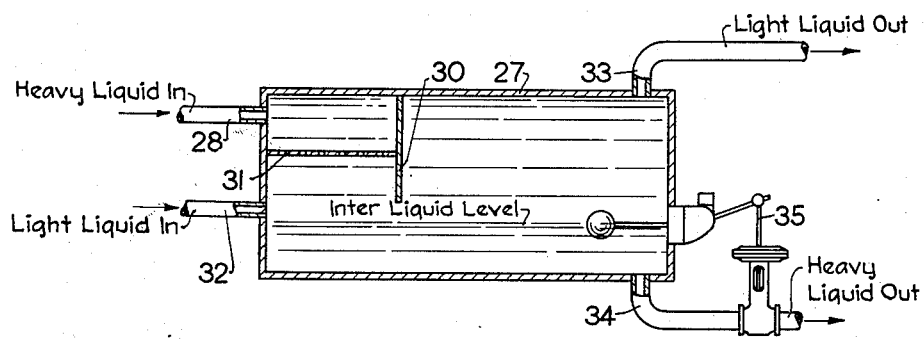
Fig. V
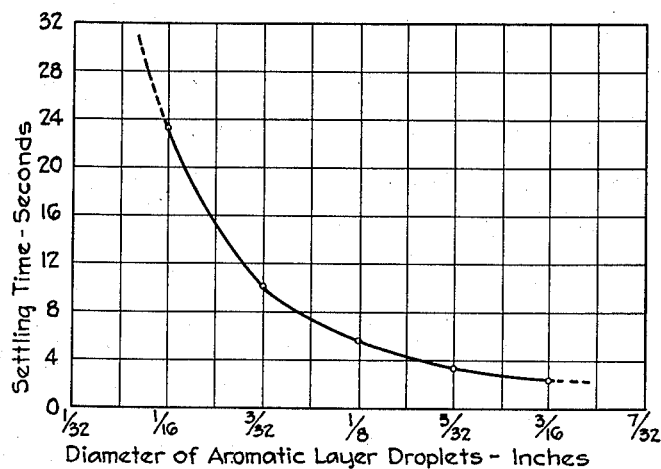
Fig. VI
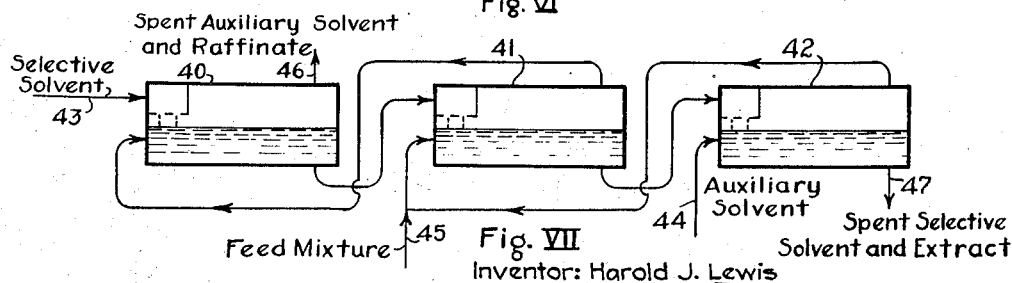
Fig. VII
Inventor: Harold J. Lewis
By His Attorney:

Patented Oct. 31, 1944

2,361,780

UNITED STATES PATENT OFFICE 2,361,780

EXTRACTION PROCESS

Harold J. Lewis, Alton, Ill., assignor to Shell Development Company, San Francisco, Calif., a corporation of Delaware Application January 12, 1942, Serial No. 426,499

3 Claims. (Cl. 196—13)

This invention relates to a method of contacting liquids of different specific gravities applicable, for example, to the separation of hydrocarbon mixtures into their component parts, e. g. relatively more highly and less highly paraffinic portions, by extraction with selective solvents. It is directly concerned with an improvement in liquid-liquid solvent extraction processes wherein the components show a certain degree of mutual miscibility (more particularly defined herein), and more specifically relates to a new method for enabling efficient contact, and at the same time permitting rapid separation of the liquid phases within the extractors of such solvent extraction plants.

It is known that mineral oils, such as lubricating oils, transformer oil, spindle oils, kerosene, gasoline, etc., as well as non-mineral oils, can be treated with selective solvents to effect a separation between components of differing characteristics. Thus a lubricating oil may be freed from all or a substantial part of its non-paraffinic components under conditions producing two phases, separating the phases and distilling them separately to recover the solvent from each of the phases.

Furthermore, it has also been proposed as an improvement of the above to separate petroleum oils into a paraffinic raffinate and an aromatic or naphthenic extract by flowing a selective solvent for naphthenic or aromatic hydrocarbons through a countercurrent treater, countercurrently to the oil, and flowing a second solvent, such as propane, which is capable of forming two liquid phases when contacted with the extract phase produced by the selective solvent, countercurrently to the extract phase, to remove from it certain paraffinic hydrocarbons which it is desired to recover with the raffinate phase.

According to a preferred mode of carrying out such an extraction process, the selective solvent is flowed through a multi-stage treater, countercurrently to an auxiliary solvent, such as a low boiling liquid or paraffinic hydrocarbon which is at least partly miscible with the selective solvent in the presence of the mixture to be extracted, and the initial mixture is introduced into the system at an intermediate point of introduction of the selective solvent and the removal of the raffinate phase, and the point of introduction of the auxiliary solvent and the removal of the extract phase. Such a process is commonly known as a "duosol" process, and is described in the United States patents to Van Dijck No. 2,023,109 and Tuttle No. 1,912,349.

The quantity of raffinate which can be produced in an extraction unit of a certain size in a given time depends upon the rapidity with which the raffinate and extract phases can be parted in each of the extraction stages. Thus when operating a process of the type described above, involving the flow of an oil countercurrently to a selective solvent through several stages, the maximum rate of through-put of the oil is often undesirably limited by the slow or incomplete separation of the phases in one or more stages. When feeding the initial oil too rapidly into the system, whether or not the rate of flow of selective solvent is varied, the mixture in one or more stages becomes cloudy or emulsified, causing some of the extract phase to move in the wrong direction, being mixed with the raffinate. As a result, the sharpness of the separation is lowered as indicated, for example, by a decrease in the viscosity index, increase in carbon residue, color or other undesirable property of the raffinate oil. Likewise the aromaticity of the extract oil may be lowered due to the entrainment of raffinate in the extract.

An auxiliary solvent of the type of propane, if used, decreases the density of the raffinate phase, lowers the solubility of certain non-paraffinic components in the raffinate oil, and improves the separation of the isotonic raffinate and extract phases in the several stages of the process. A certain improvement in the speed of partition of the phases between the points of introduction of the feed and the selective solvent can be obtained by increasing the ratio of the auxiliary solvent to the initial oil, as by lowering the rate of feed of the oil (which is economically undesirable) and/or by introducing more auxiliary solvent into the process. In spite of this, however, lower auxiliary solvent ratios or at least no increase beyond the region wherein the further amounts of auxiliary solvent fail to increase materially the selectivity of the selective solvent are to be desired. Any further increase may upset the desired relationship between the liquid phases in the apparatus, since it excessively increases the size of the raffinate phase in the deraffinating stages, i. e. between the point of introduction of the feed and the point of introduction of the auxiliary solvent, resulting in decreased through-puts and higher recovery costs per unit product.

It is an object of the present invention to provide an improved process for separating liquid mixtures in countercurrent operations, employing liquid selective solvents, to improve the sharpness of the operation, as indicated, for example, by the quality of the raffinate phase and/or the extract phase, or by the yield of the raffinate of a good quality or composition. Another object is to provide a method of contacting the liquid layers, e. g. the aromatic and paraffinic layers within an extraction zone, which method combines rapid attainment of phase equilibrium with maximum rate of separation of the phases, so that the throughput through a given zone can be increased over that which heretofore has been possible. It is a further object to operate a duosol extraction process of the type described in United States Patents Nos. 1,912,349 and 2,023,109 in a more effective manner, whereby auxiliary solvent ratios may be lowered to render the process more flexible, and the amount of oil which can be treated in an apparatus of a given size increased. In addition, it is a purpose to provide a certain novel apparatus for contacting two liquids possessing certain miscibility relations, as is explained below.

In carrying out my invention, two liquids, partially immiscible with one another so as to form two separate liquid phases when in equilibrium contact with one another but containing components soluble in both, are flowed countercurrently to one another under conditions so that one liquid remains substantially continuous while the other breaks up into droplets, the sizes of substantially all of which range from $1/64$ to $1/4$ inch in diameter, and preferably from $1/16$ to $1/8$ inch in diameter. The two resulting contacted liquids are then separately withdrawn.

Liquids to which the above treatment is particularly applicable include oily substances such as hydrocarbon oils, fatty acids, fatty alcohols, ethereal oils, fatty oils, etc., and the treatment involves counterflowing a selective solvent for a portion of the oily substance such as phenol, cresylic acids or mixtures thereof, nitrobenzene, aniline, beta beta dichlor diethyl ether, acetone, furfural, crotonaldehyde, liquid $SO_2$, liquid $SbCl_3$, etc. If desired, an auxiliary solvent, which is at least partially immiscible with the selective solvent and is capable of dissolving the portion of the oily substance insoluble in the selective solvent, may flow countercurrent to the selective solvent. Suitable auxiliary solvents frequently increase the difference between the specific gravities of the two liquid phases, thereby increasing the rate of their separation.

Apparatus suitable for effecting this type of contact is shown in the attached drawings.

Figure I of the drawings is a side elevation of an extraction chamber showing a suitable mixing device.

Figure II is a partial plan view of that end of the chamber I which contains the mixing device, taken at II—II of Figure I.

Figures III, IV and V are modifications of Figure I showing different arrangements of the sprinkling devices.

Figure VI is a graph wherein the diameter of the aromatic layer droplets in inches is plotted against the settling time in seconds.

Figure VII is a simplified flow diagram of a plant embodying a series of extraction chambers.

Referring to the Figure I, I is a horizontal cylindrical extraction tank; 2 indicates an inlet pipe leading into the upper portion of the tank for introducing a heavy fluid; 3 is a sprinkler arrangement shown in more detail in Figure II and consisting essentially of a spider or equivalent pipe arrangement having holes of predetermined size drilled into it closely spaced. These holes are preferably directed upward. 4 designates a vertical baffle plate extending from the ceiling of the tank partway downward, thereby dividing the chamber into a contact section and a disengaging section and forestalling turbulence in the disengaging section during operation. 5 indicates inlet means for the lighter liquid located at a level below that of sprinkler 3 and above the interface of the two liquids maintained in the lower portion of the chamber; 6 and 7 designate outlet means for the light and heavier liquids, respectively, and 8 is a liquid level controller.

In operation, chamber I is full of liquid, an interface level between the two liquids being maintained in the lower portion of the chamber, as already indicated. Thus the lighter liquid takes up most of the space in chamber I, traveling slowly from the intake line 5 past baffle plate 4 toward outlet 6. The heavy liquid is injected upward through the spider into the tank, resulting in a "rain" of heavy droplets falling through the lighter liquid and accumulating at the interface to produce a lower continuous layer of heavy liquid. As both liquids travel from the intake side of the chamber past the baffle plate 4 toward the respective outlets, small amounts of suspended droplets, that may have failed to settle out in the contact section from either of the two liquids, will separate out in the disengaging section.

The above extraction apparatus is susceptible to several modifications. For example, the holes in the sprinkler need not point upward, but if desired, may point sideways or downward. Moreover, if desired, instead of passing the heavy liquid through a body of the light liquid, the process may be reversed and the light liquid may be passed through a body of the heavier liquid, the sprinkler in this case being near the bottom of the chamber. This arangement is shown in Figure III wherein 9 designates the horizontal extraction tank, 10 and 13 inlet means for the light and heavy liquids, 11 the sprinkler mechanism immersed in the heavy liquid, 12 the baffling arrangement, 16 a liquid level controller, and 14 and 15 outlet means for the light and heavy liquids respectively.

Furthermore, if desired, both methods may be combined, heavy liquid "raining" through a body of light liquid, and simultaneously light liquid rising through a body of heavy liquid, the interface level between the two liquids being approximately in the middle of the chamber. Thus in Figure IV, 17 designates the horizontal extraction tank, 18 and 20 are inlet means, 19 and 21 are sprinkler mechanisms immersed in the light and heavy liquids respectively, 22 and 23 indicate baffles, 26 a liquid level controller, and 24 and 25 are outlet means.

Another possible arrangement of apparatus as shown in Figure V is one wherein the liquid, which is to be broken into droplets, is introduced into the vessel above a so-called shower deck. This sprinkling device is a flat section of metal so designed and sealed into the vessel that none of the above-mentioned liquids can freely pass over or around its edges, but must fall or rise through holes of desired size which have been drilled into it. Thus in Figure V 27 indicate the extraction tank, 28 and 32 inlet means, 31 designates the so-called shower deck, 30 an extended baffle, 35 a liquid level controller, and 33 and 34 outlet means for the light and heavy liquids. It is understood that the shower deck may be immersed in the lower liquid to act similar to the sprinkler in Figure III.

In Figure VII a simplified flow diagram of a series of three chambers 40, 41 and 42 are shown wherein the heavy liquid or selective solvent is introduced at 43 into chamber 40 near one end of the system and the light liquid or auxiliary solvent is introduced at 44 into chamber 42 near the other end of the system while the feed mixture or oil to be separated is introduced at 45 into chamber 41 intermediate the two solvent inlets. The auxiliary solvent and raffinate are withdrawn from the top of chamber 40 at 46 and the selective solvent and extract are withdrawn from the bottom of chamber 42 at 47, one on each side of the point where the feed is introduced at 45. In this system the two solvents and components of the mixture flow countercurrently to each other through each chamber; the heavier liquid always being introduced near the top of the chamber to be sprayed through a continuous phase of the lighter liquid. Instead of three chambers as shown in Figure VII, a series of four or more may be used.

In the conventional methods of contact usually employed in solvent extraction processes, the liquids are quite thoroughly mixed. This unfortunately results in the formation of droplets of haphazard size, i. e. some very large and others very small. In my process all excessive mixing and turbulence in the extractors are eliminated due to the fact that the two layers are not brought into contact with each other when they are moving at high velocities. The only impetus given one layer to pass through the other is that of gravity, augmented by the spraying action imparted by the sprinkler which is sufficient to cover completely the extraction zone without causing the liquid to be broken into droplets too small for fast settling. My method, in contrast to conventional methods, therefore, results in the formation of droplets of a chosen uniform size, substantially to the exclusion of both larger and smaller droplets.

The size of the droplets produced is largely a function of several variables, e. g. size of the holes in the sprinkler or shower deck, velocity of injection, i. e. velocity of the liquid through the holes, interfacial tension between the two liquids, their viscosities, presence of impurities having emulsifying properties, etc. For this reason it is usually impractical to calculate from the size of the holes in the sprinkler the resulting particle size, and the preferred manner of determining suitable spray hole sizes is by contacting the two liquids under examination at approximately the contemplated velocities in a laboratory apparatus, using sprinklers with different size holes and measuring in each experiment the time required for the droplets to fall a certain distance. With the aid of a modified Stokes law equation the average size of the droplets can then be very closely calculated.

The relation between droplet size and settling time is illustrated in Figure VI of the drawings for a representative "duosol" mixture, i. e. an aromatic solvent layer consisting approximately of 65% V. of a phenol-cresol mixture, 30% V. of propane and 5% V. lubricating oil extract, and a raffinate layer consisting approximately of 75% V. propane, 15% V. paraffinic lubricating oil and 10% V. of the phenol-cresol mixture. As will be noted, at droplet sizes below about 1/64 to 1/16 inch the time of settling increases rapidly with further decrease in size, while in the range above those limits the settling time is at least reasonable. The figures used in plotting Figure VI are for droplets falling a distance of 4 feet, which is an average radius for plant scale horizontal cylindrical extractors, and which would be the approximate distance a droplet would have to travel to the inter-liquid level in such a vessel. The settling time for a given size particle through a given liquid is, of course, dependent upon the distance the particle travels.

For the most part, the choice of the minimum droplet size will be determined by the time available for the settling within the extractors. Particles which do not have a diameter of at least 1/64 inch or larger do not settle in conventional settling equipment and are carried along with the other layer leaving the compartment.

Whereas according to the above it would be desirable for reasons of quick separation to contact the two liquids very superficially, the necessity of having to reach equilibrium or approaching equilibrium at least as closely as possible between the contact phases within the time permitted to effect complete separation places a rather definite upper limit on the droplet size.

In the past it has quite generally been accepted that in solvent extraction intimacy of contact is fundamentally important, and that the more thorough the mixing the better the extraction. However, my investigation has shown this assumption to be erroneous for solvent extraction processes wherein the two phases are partially miscible, i. e. containing at least 10% of components soluble in both phases; and that on the contrary in such systems almost immediate equilibrium may be established even though the contact be relatively superficial.

Though I do not wish to limit myself to any theory, I explain my discovery as follows: The maximum efficiency of an extraction under a given set of conditions of mixing, time of contact, etc., may be said to depend upon two factors, namely, a "rate of exchange coefficient" and the reaction surface exposed. The term "rate of exchange coefficient" as used herein is meant to account for the way in which the rate of extraction depends on the nature of the individual liquids when other factors such as temperature, mixing, time of contact, etc., are fixed.

For processes where the components are relatively completely immiscible, this rate of exchange coefficient appears to be very low, and thus the surface exposed must be large, or specifically, very small droplets which expose a large total surface are necessary. Thus, in the so-called Solutizer process, wherein mercaptans are extracted from gasoline with aqueous solutions of alkali metal hydroxides, the extraction efficiency is greatly improved when mixing is carried to the point where emulsions are formed, or at least to the point where the droplet size of one of the liquids approaches the particle size for emulsoids. By contrast, however, in processes such as the conventional lubricating oil extraction processes where the two phases show a relatively high degree of mutual miscibility, the rate of exchange coefficient is high, and therefore the reaction surface may be decreased by increasing the droplet size.

In determining the maximum particle size, several factors must be considered. As the particle size (or spray hole size) is increased, the settling time decreases, until at a given size, droplets settle so rapidly that no distinction can be made between them, resulting in so-called streamlined flow. For intermediate droplet sizes, there is at the beginning streamlined flow and later droplet flow, the length of the streamlined flow being proportional to the size of the spray hole. Since, as explained above, the maximum efficiency of extraction is dependent on the relationship between the rate of exchange coefficient of the system and the reaction surface exposed, and, whereas in most cases of extraction where the components are at least 10% miscible in one another, the former is a constant or virtually so, the variable factor is the latter. Obviously, then, it would be advantageous to set the maximum size of the particles or spray holes at that which would give only a short distance of streamlined flow, or conversely, a large distance for droplet flow. With the above in mind, it will not usually be found advisable to use droplet sizes larger than about ¼ inch in diameter. Although in some few cases droplets as large as ¼ inch may be obtained, in general, for optimum efficiency in the great majority of cases a droplet size between $\tfrac{1}{16}$ and $\tfrac{3}{16}$ inch in diameter will be found most suitable.

The marked improvement obtainable by the use of my method is illustrated in the following examples.

Example I

A commercial duosol extraction plant, wherein propane and phenol-cresol mixture flow in countercurrent through 9 compartments, oil being fed to the third compartment, was operated with de-asphalted, dewaxed Mid-Continent long residuum having a S. U. viscosity at 210° F. of 100–110 seconds, under conditions which would allow a charge rate of not over 24,000 lb./hr. of oil without encountering an upset condition in the extractors. A small pilot plant extraction compartment embodying the salient features of my invention was installed at the extraction plant. This vessel was operated by drawing a slip stream from the plant extractor; this could be varied so that the pilot extractor would simulate any one of the plant compartments desired. The aromatic and paraffinic layers were introduced separately the aromatic layer being broken up into small droplets and sprayed through the paraffinic layer. This was the only means of contact between the two. It was found possible to operate the pilot extractor at a rate equivalent to a plant throughput of 54,000 lb./hr. without suffering any loss in the efficiency of extraction. Also it was noted that at this increased rate of throughput the solvent carryover in the pilot operation was less than that in the plant at the much lower throughput. This indicates that better settling conditions were prevalent in the pilot extractor, and simultaneously a degree of equilibrium was obtained at least equal to that of the plant.

Example II

In another case the plant was operated with stocks similar to those of Example I, under conditions which would allow a charge rate of not over 36,000 lb./hr. of oil. At the same time, the pilot plant extractor was operated at a rate equivalent to a plant throughput of 54,000 lb./hr.

Example III

Employing a laboratory batch countercurrent duosol pilot plant, two separate runs were made. The first was carried out in the normal manner with appreciable mixing between layers at each stage. The second was carried out by applying the principle of mixing with controlled particle size and spraying of the extract phase. The raffinates produced in both runs were examined and found to be identical in quality, indicating the efficiency of extraction to be unimpaired.

I claim as my invention:

1. In a continuous duosol extraction process for separating a hydrocarbon oil into portions of different properties which comprises continuously introducing a selective solvent for non-paraffinic oil components into a multi-stage countercurrent extraction apparatus at a first point, continuously introducing auxiliary solvent for paraffinic components at a second point spaced from the first, said auxiliary solvent and selective solvent being adapted to form two liquid phases when mixed with said oil under the conditions of the process, counterflowing said solvents in the apparatus, introducing said hydrocarbon oil into the counterflowing solvents at a third point intermediate said first and second points, and removing said counterflowing solvents containing dissolved oil components at spaced points on either side of said third point, the improvement which comprises increasing the capacity of said apparatus by contacting said phases under conditions such that one of the phases remains substantially continuous while another breaks up into droplets substantially all of which have diameters between $\tfrac{1}{16}$ and $\tfrac{3}{16}$ inch.

2. In a continuous liquid solvent extraction process for the separation of paraffinic and non-paraffinic portions of a hydrocarbon oil containing the same which comprises flowing said oil through an extraction zone countercurrently to a selective solvent, said oil and said selective solvent being at least 10% miscible in one another to result in two liquid phases of different specific gravities, one of which phases is an extract phase and the other a raffinate phase, which phases upon settling are separately withdrawn from an extraction zone, the improvement comprising contacting said hydrocarbon oil with said selective solvent under conditions such that one of the phases remains substantially continuous while the other breaks up into droplets substantially all of which have diameters between $\tfrac{1}{16}$ and $\tfrac{3}{16}$ inch.

3. In a continuous duosol liquid extraction process for separating a hydrocarbon oil into portions of different properties which comprises continuously introducing a phenol selective solvent for non-paraffinic oil components into a multi-stage countercurrent extraction apparatus at a first point, continuously introducing a propane auxiliary solvent for paraffinic components at a second point spaced from the first, said propane and phenol being adapted to form two liquid phases when mixed with said oil under the conditions of the process, counterflowing said solvents in the apparatus, introducing said hydrocarbon oil into the counterflowing solvents at a third point intermediate said first and second points, and removing said counterflowing solvents containing dissolved oil components at spaced points on either side of said third point, the improvement which comprises increasing the capacity of said apparatus by contacting said phases under conditions such that one of the phases remains substantially continuous while another breaks up into droplets substantially all of which have diameters between $\tfrac{1}{16}$ and $\tfrac{3}{16}$ inch.

HAROLD J. LEWIS.